United States Patent

Sayles et al.

[11] Patent Number: 5,924,731
[45] Date of Patent: Jul. 20, 1999

[54] HEIGHT ADJUSTER FOR SEAT BELT WEBBING

[75] Inventors: Robert D. Sayles, Rochester; Matthew C. Frank, Troy, both of Mich.

[73] Assignee: TRW Vehicle Safety Systems Inc., Lyndhurst, Ohio

[21] Appl. No.: 09/102,141

[22] Filed: Jun. 22, 1998

Related U.S. Application Data

[51] Int. Cl.[6] .............................. B60R 22/34; B60R 22/20
[52] U.S. Cl. .......................................... 280/807; 280/801.2
[58] Field of Search ................................ 280/801.2, 808, 280/806; 297/483

[56] References Cited

U.S. PATENT DOCUMENTS

| | | |
|---|---|---|
| 4,538,832 | 9/1985 | Anderson . |
| 4,556,255 | 12/1985 | Kawai . |
| 4,579,368 | 4/1986 | Kawade et al. . |
| 4,989,900 | 2/1991 | Steinhüser . |
| 5,066,043 | 11/1991 | Tokugawa . |
| 5,265,908 | 11/1993 | Verellen et al. . |
| 5,366,243 | 11/1994 | Ray et al. . |
| 5,460,410 | 10/1995 | Petzi et al. ........................ 280/801.2 |
| 5,482,325 | 1/1996 | Moller et al. ..................... 280/801.2 |
| 5,531,479 | 7/1996 | Bauer . |
| 5,566,978 | 10/1996 | Fleming et al. ................... 280/801.2 |
| 5,860,675 | 1/1999 | Muller et al. ..................... 280/801.2 |

*Primary Examiner*—Lanna Mai
*Assistant Examiner*—Lynda Jasmin
*Attorney, Agent, or Firm*—Tarolli, Sundheim, Covell, Tummino & Szabo

[57] ABSTRACT

A seat belt height adjuster (30) includes a track (34), a slider (36) movable vertically along the track (34), and a latch (102) mounted on the slider (36). The track (34) has a plurality of latch openings (62) which are spaced apart along the track (34). The latch (102) is receivable in each latch opening (62) to block movement of the slider (36) downward along the track (34). The track (34) further has a plurality of spaced-apart directing portions (80) corresponding to the plurality of latch openings (62). Each directing portion (80) of the track (34) is configured to constrain the latch (102) to move into the next lower latch opening (62) upon movement of the latch (102) downward along the track (34) from a latch opening (62) to the next lower latch opening (62).

9 Claims, 3 Drawing Sheets

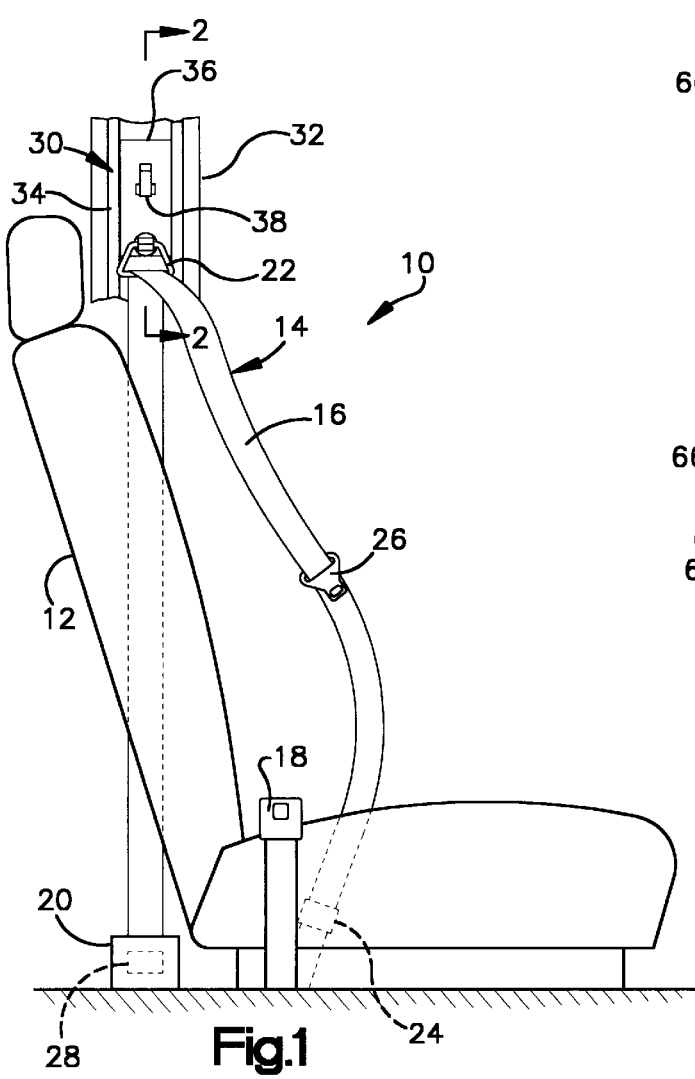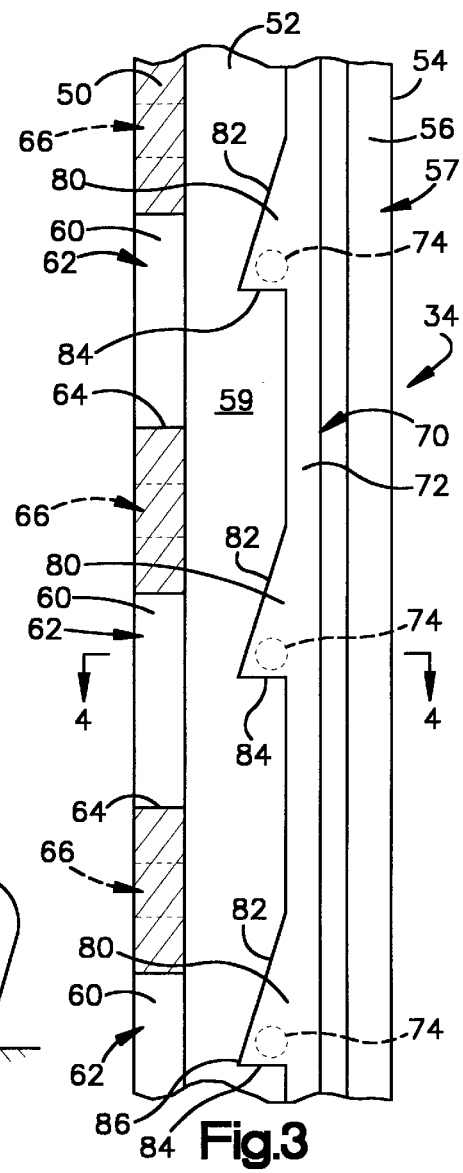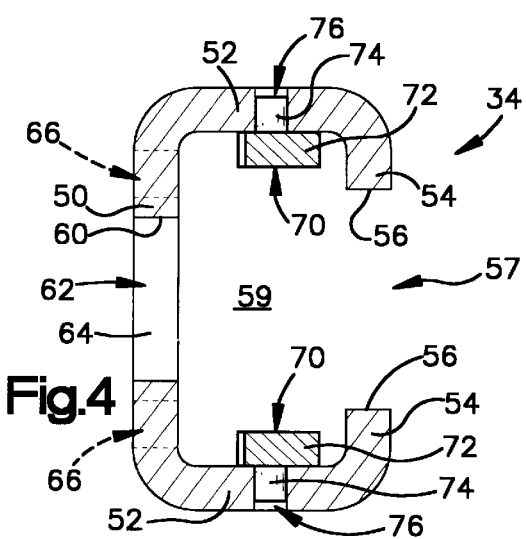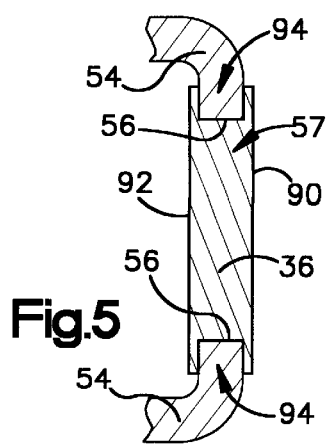

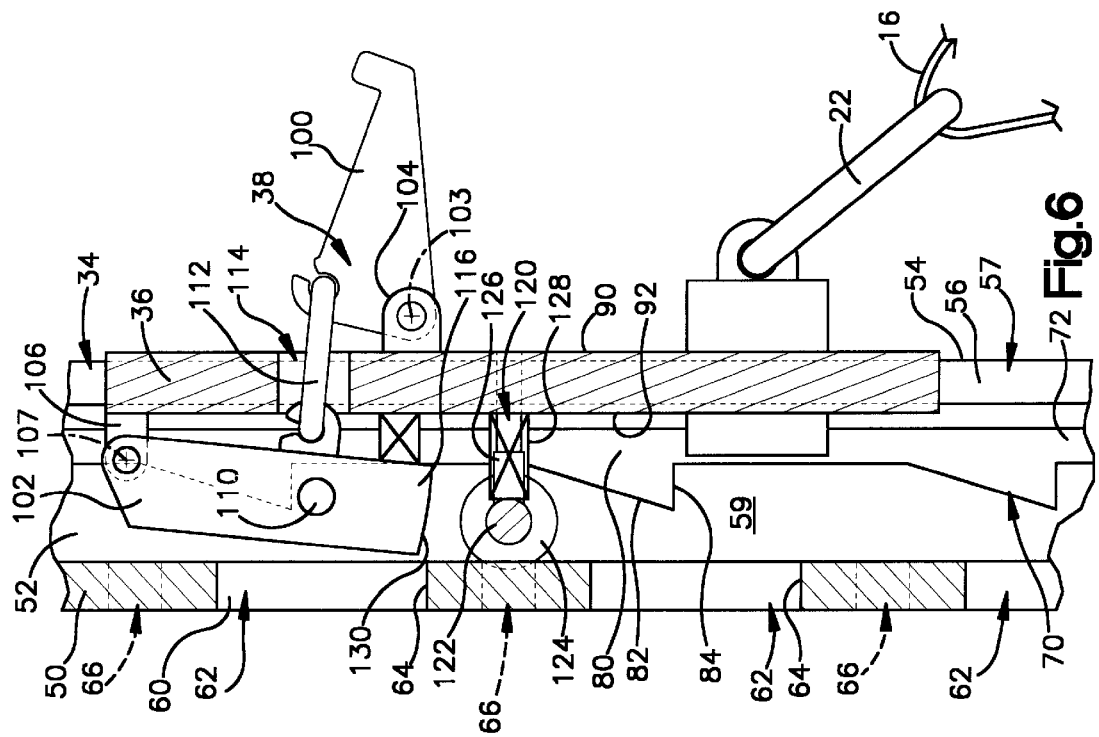
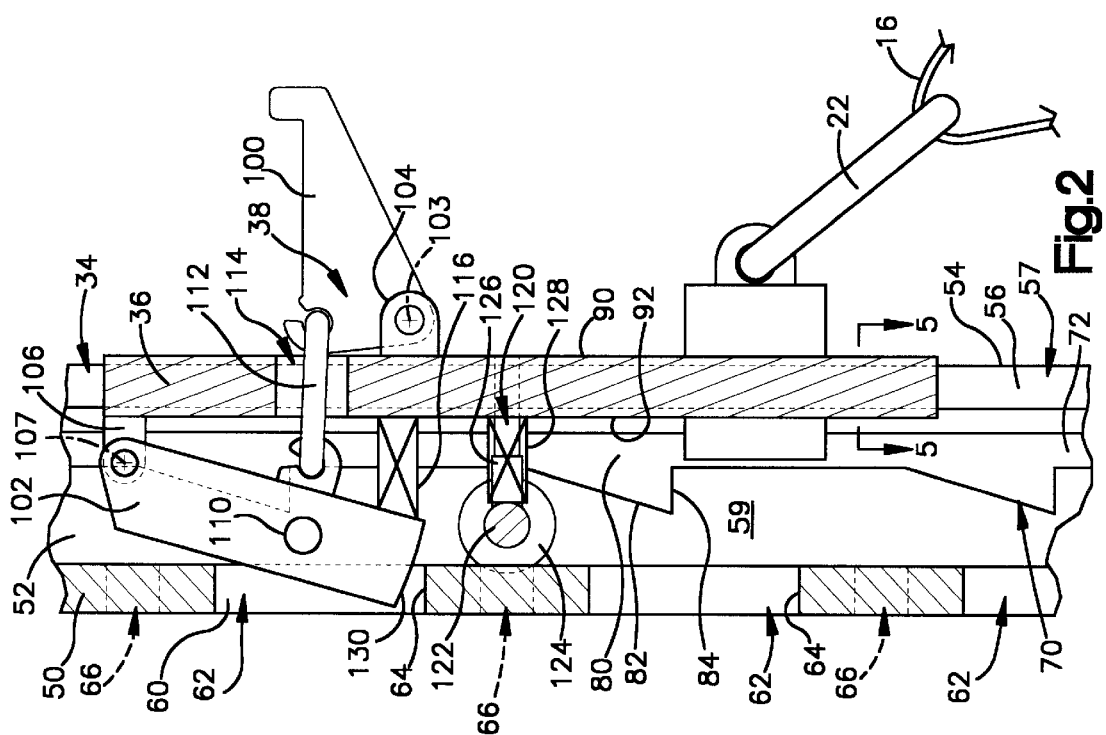

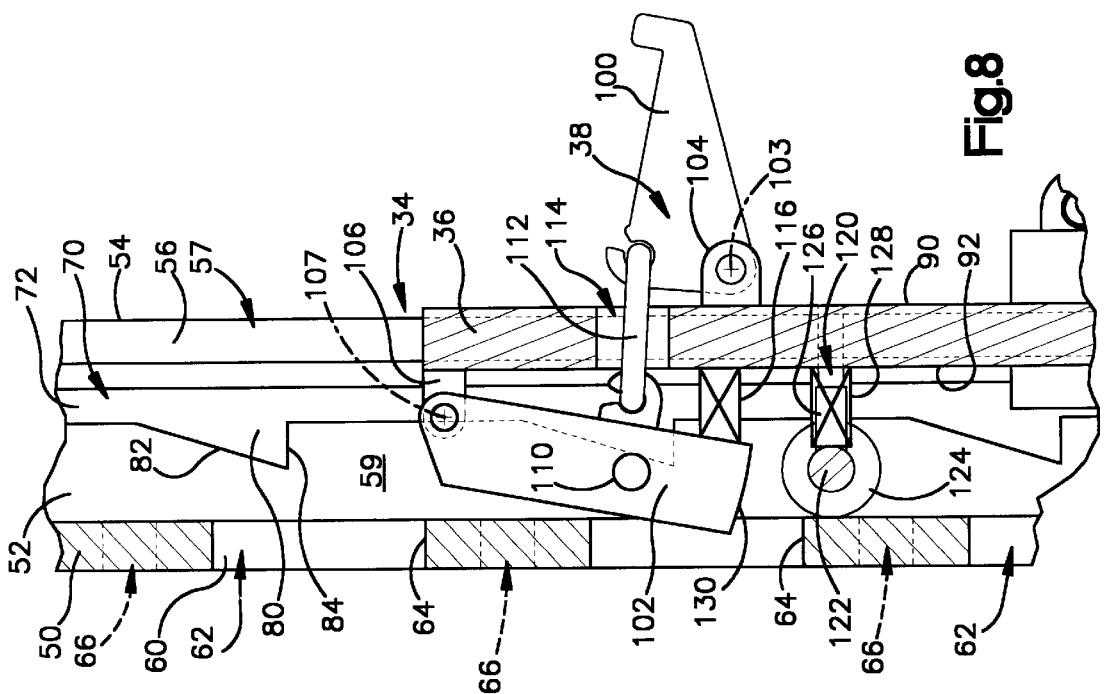
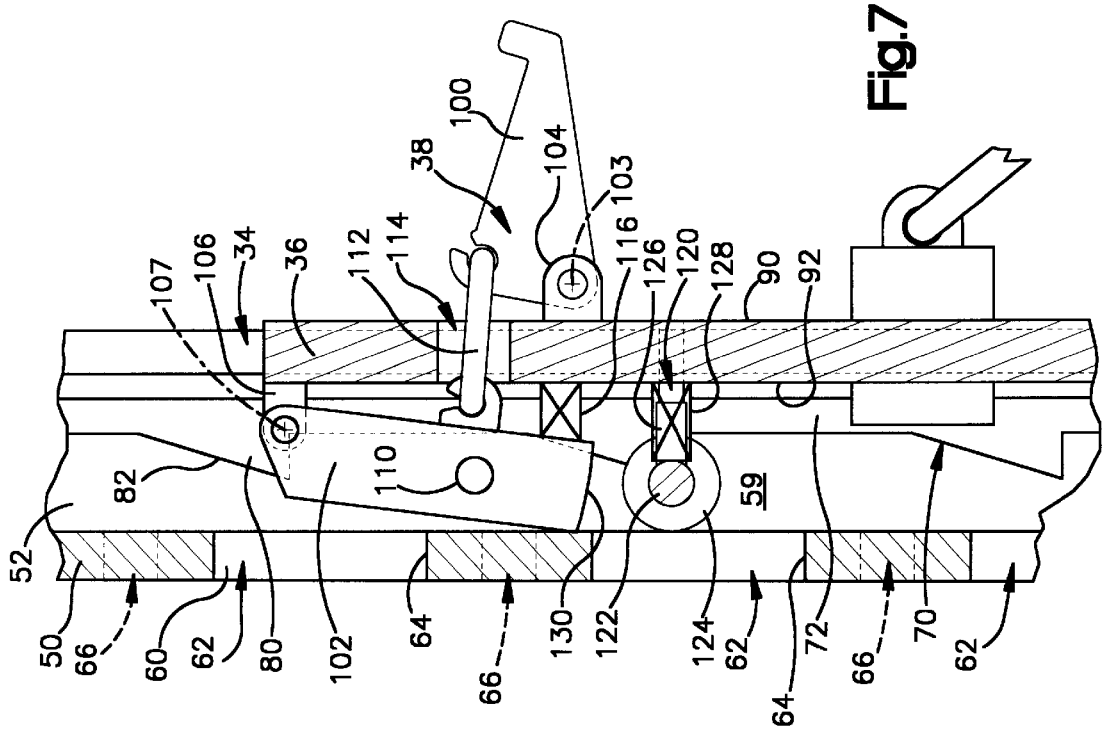

5,924,731

HEIGHT ADJUSTER FOR SEAT BELT WEBBING

FIELD OF THE INVENTION

The present invention relates to an apparatus for adjusting the height of seat belt webbing adjacent to the 5 shoulder of a seated vehicle occupant.

BACKGROUND OF THE INVENTION

A seat belt system for use in a vehicle typically includes seat belt webbing, a seat belt retractor, and a seat belt buckle. A locking tongue on the webbing is releasably lockable in the buckle when the webbing has been extracted from the retractor and extended around a seated occupant of the vehicle. In some cases, the webbing extends through a D-ring which is mounted in the vehicle adjacent to the occupant's shoulder. Such a seat belt system may include a height adjuster for adjusting the height of the D-ring.

A seat belt system may further include a pretensioner which is actuated upon the occurrence of a vehicle crash. When the pretensioner is actuated, it imparts tension to the webbing to help the webbing restrain the vehicle occupant.

SUMMARY OF THE INVENTION

In accordance with the present invention, an apparatus comprises a seat belt height adjuster including a track, a slider movable vertically along the track, and a latch mounted on the slider. The track has a plurality of latch openings which are spaced apart along the track. The latch is receivable in each latch opening to block movement of the slider downward along the track. The track further has a plurality of spaced-apart directing portions corresponding to the plurality of latch openings. The directing portions of the track are configured to constrain the latch to move into the next lower latch opening upon movement of the latch downward along the track from a latch opening to the next lower latch opening.

BRIEF DESCRIPTION OF THE DRAWINGS

The foregoing and other features of the present invention will become apparent to one skilled in the art to which the present invention relates upon reading the following description with reference to the accompanying drawings, wherein:

FIG. 1 is a view of a vehicle seat and a seat belt system comprising a preferred embodiment of the present invention;

FIG. 2 is a view taken generally along line 2—2 of FIG. 1;

FIG. 3 is a separate view of parts shown in FIG. 2;

FIG. 4 is a view taken along line 4—4 of FIG. 3;

FIG. 5 is a view taken along line 5—5 of FIG. 2;

FIG. 6 is a view similar to FIG. 2 showing parts in different positions; and

FIGS. 7 and 8 also are views similar to FIG. 2 showing parts in different positions.

DESCRIPTION OF A PREFERRED EMBODIMENT

An apparatus 10 comprising a preferred embodiment of the present invention is shown in FIG. 1. The apparatus 10 includes a vehicle seat 12 and a seat belt system 14 for restraining an occupant of the seat 12. The seat belt system 14 includes seat belt webbing 16 and a seat belt buckle 18. The webbing 16 extends upward from a seat belt retractor 20 to a D-ring 22, through the D-ring 22, and downward from the D-ring 22 to an anchor 24. A locking tongue 26 on the webbing 16 is releasably lockable in the buckle 18 when the webbing 16 has been extracted from the retractor 20 and extended around an occupant of the seat 12.

The seat belt system 14 further includes a seat belt pretensioner 28 (shown schematically). The pretensioner 28 is a known device that cooperates with the retractor 20 to impart tension to the webbing 16 suddenly upon the occurrence of a vehicle crash. Such tension helps the webbing 16 restrain an occupant of the seat 12.

A height adjuster 30 supports the D-ring 22 on a vehicle pillar 32 beside the seat 12. As shown in FIGS. 1 and 2, the height adjuster 30 includes a vertically extending track 34 and a slider 36 which is movable along the track 34. The D-ring 22 is mounted on the slider 36 for movement along the track 34 with the slider 36. A manually operable latch mechanism 38 also is mounted on the slider 36. The latch mechanism 38 interlocks the slider 36 releasably with the track 34 at any one of a plurality of positions that may be selected by a vehicle occupant. A plastic trim structure (not shown) may be used to conceal parts of the height adjuster 30 from view in the vehicle occupant compartment.

As shown separately in FIGS. 3 and 4, the track 34 has a generally C-shaped cross-sectional configuration defined by a rear wall 50, a pair of opposite side walls 52, and a pair of front walls 54. The front walls 54 extend from the side walls 52 oppositely toward each other, and have opposed, parallel free end surfaces 56. The free end surfaces 56 of the front walls 52 are spaced apart across a gap 57 extending the entire length of the track 34 opposite the rear wall 50. In this configuration, the walls 50–54 of the track 34 together define a partially enclosed passage 59 which also extends the entire length of the track 34.

The rear wall 50 of the track 34 has inner edge surfaces 60 defining latch openings 62. The latch openings 62 are shaped as slots that are elongated lengthwise of the track 34, i.e., vertically as viewed in FIG. 3, and are evenly spaced apart in a vertically extending row opposite the gap 57 at the front of the track 34. A bottom portion 64 of each inner edge surface 60 defines the lower end of the corresponding latch opening 62.

In addition to the latch openings 62, the rear wall 50 of the track 34 has a plurality of small circular apertures 66. The apertures 66 are arranged in pairs, one of which is shown in phantom view in FIG. 4. Each pair of apertures 66 is located vertically between adjacent latch openings 62, as shown partially in phantom view in FIG. 3. Importantly, each pair of apertures 66 defines one of the positions that a vehicle occupant may select for the slider 36. This is described more fully below with reference to FIG. 2.

The track 34 includes a pair of directing members 70. The directing members 70 are vertically elongated structures that are mounted on the side walls 52 within the passage 59. Each directing member 70 includes a strip 72 having a saw-tooth configuration. Each directing member 70 further includes a plurality of mounting pegs 74. The mounting pegs 74 project transversely from the strips 72 and are received tightly within peg holes 76 in the side walls 52.

The strips 72 are alike. As best shown in FIG. 3, the saw-tooth configurations are defined by teeth 80 which are evenly spaced apart lengthwise of the strips 72. Each tooth 80 has a ramp surface 82 and a lower end surface 84. The ramp surface 82 of each tooth 80 is inclined downward across the passage 59 toward a corresponding latch opening 62 in the rear wall 50.

As shown in FIG. 2, the slider 36 is received in the gap 57 at the front of the track 34. The slider 36 is a vertically elongated plate with a front face 90, a rear face 92, and a pair of grooves 94 (FIG. 5) at its opposite side edges. The front walls 54 of the track 34 project into the grooves 94 to support the slider 36 for sliding movement vertically in the gap 57.

The latch mechanism 38 (FIG. 2) includes a lever 100 and a latch 102. The lever 100 is located outside the passage 59 in the track 34, and is supported for movement pivotally about a horizontal outer axis 103. The outer axis 103 is defined by an outer bearing structure 104 which is mounted on the front face 90 of the slider 36. An inner bearing structure 106 is mounted on the rear face 92 of the slider 36. The inner bearing structure 106 defines a horizontal inner axis 107 within the passage 59 in the track 34. The latch 102 is mounted on the inner bearing structure 106 for movement pivotally about the inner axis 107.

A pair of ramp followers 110, one of which is shown in FIG. 2, are located on opposite sides of the latch 102. The ramp followers 110 are alike and project transversely from the latch 102 in opposite directions relative to each other.

A link 112 extends through an aperture 114 in the slider 36 to connect the lever 100 with the latch 102. A latch spring 116 (shown schematically) acts between the rear face 92 of the slider 36 and the latch 102. The latch spring 116 continuously urges the latch 102 to move pivotally about the inner axis 107 in a clockwise direction, as viewed in FIG. 2. When a vehicle occupant moves the lever 100 pivotally about the outer axis 103 in a clockwise direction (also as viewed in FIG. 2), the link 112 moves the latch 102 pivotally about the inner axis 107 in a counterclockwise direction against a bias of the latch spring 116.

The latch mechanism 38 further includes a detent device 120 which acts between the slider 36 and the track 34. The detent device 120 includes an axle 122 and a pair of detent rollers 124 (one of which is shown in FIG. 2) at i-* opposite ends of the axle 122. The axle 122 is mounted on a shaft structure 126 which is telescopically compressible and extendible between the rear face 92 of the slider 36 and the rear wall 50 of the track 34. A detent spring 128 (shown schematically) biases the axle 122 toward the rear wall 50, and thus holds the detent rollers 124 in rolling contact with the rear wall 50.

As noted above, each pair of apertures 66 in the rear wall 50 defines one of the positions that a vehicle occupant may select for the slider 36. FIG. 2 shows the slider 36 in one of those positions. The detent rollers 124 are received in the corresponding pair of apertures 66, and are releasably held in place by the detent spring 128. The latch 102 is then received in the latch opening 62 that is located immediately above the corresponding pair of apertures 66. A lower end surface 130 of the latch 102 is spaced a short distance upward from the surface portion 64 of the track 34 at the lower end of the latch opening 62. Accordingly, if tension in the webbing 16 pulls the D-ring 22 and the slider 36 downward from the position of FIG. 2, the lower end surface 130 of the latch 102 will move a short distance downward into contact with the adjacent surface portion 64 of the track 34. The latch 102 will then block further movement of the slider 36 and the D-ring 22 downward along the track 34.

When the slider 36 moves slightly downward from the position of FIG. 2 in the foregoing manner, the detent rollers 124 roll slightly outward of the apertures 66 against the bias of the detent spring 128. When the tension in the webbing 16 is relieved, the detent rollers 124 roll back inward of the apertures 66 under the influence of the spring 128 so as to move the slider 36 back upward to the position of FIG. 2.

A vehicle occupant may wish to move the slider 36 from the position of FIG. 2 to adjust the height of the webbing 16 at the D-ring 22. If the occupant pushes the slider 36 upward from the position of FIG. 2, the latch 102 will pivot out of the latch opening 62 upon sliding upward against the track 34 at the top of the latch opening 62. If the occupant wishes to move the slider 36 downward, the lever 100 must be moved pivotally about the outer axis 103 from the position of FIG. 2 to the position of FIG. 6. This causes the latch 102 simultaneously to pivot about the inner axis 107 from the position of FIG. 2 to the position of FIG. 6. The latch 102 is then withdrawn fully from the adjacent latch opening 62 and can be moved downward to a lower latch opening 62.

The vehicle occupant may inadvertently leave the slider 36 at a location vertically between two adjacent positions defined by the apertures 66. As shown by way of example in FIG. 7, the latch 102 might then adjoin the rear wall 50 of the track 34 at a location vertically between a pair of adjacent latch openings 62. If the pretensioner 28 (FIG. 1) is actuated when the slider 36 is in such a position, the tension that is suddenly imparted to the webbing 16 could move the slider 36 downward past one or more of the latch openings 62 before the spring 116 moves the latch 102 into a latch opening 62 to stop the slider 36. Therefore, in accordance with the present invention, the directing members 70 are configured to constrain the latch 102 to move into the next lower latch opening 62 independently of the spring 116 upon movement of the slider 36 downward along the track 34.

Specifically, when the slider 36 moves downward from the position of FIG. 7, the ramp followers 110 on the latch 102 move against the teeth 80 adjacent to the next lower latch opening 62 in the track 34. As the ramp followers 110 slide along the ramp surfaces 82, as indicated in FIG. 8, they are directed across the passage 59 toward the rear wall 50 of the track 34. The latch 102 is thus constrained to move pivotally about the inner axis 107 in the clockwise direction (as viewed in FIGS. 7 and 8) so as to move into the next lower latch opening 62. As a result, the lower end surface 130 of the latch 102 can move against the next adjacent surface portion 64 of track 34 to block movement of the slider 36 further downward under the influence of the pretensioner 28.

In accordance with the foregoing feature of the present invention, the teeth 80 on the track 34 constrain the latch 102 to move into the next lower latch opening 62 upon movement of the latch 102 along the track 34 from any one of the latch openings 62 to the next lower latch opening 62. However, the lower end surface 84 of each tooth 80 is spaced upward from the surface 64 at the lower end of the adjacent latch opening 62. This spacing provides clearance for each ramp follower 110 to move beneath an adjacent tooth 80, as shown in FIG. 6, and thus enables a vehicle occupant to withdraw the latch 102 from each successive latch opening 62 in the manner described above with reference to FIGS. 2 and 6.

From the above description of the invention, those skilled in the art will perceive improvements, changes and modifications. Such improvements, changes and modifications within the skill of the art are intended to be covered by the appended claims.

Having described the invention, the following is claimed:

1. Apparatus comprising:

a seat belt height adjuster including a track, a slider movable vertically along said track, and a latch mounted on said slider;

said track having a plurality of latch openings which are spaced apart along said track;

said latch being receivable in each of said latch openings to block movement of said slider downward along said track;

said track further having a plurality of spaced-apart directing portions corresponding to said plurality of latch openings, each of said directing portions of said track being configured to constrain said latch always to move into a next lower latch opening upon movement of said latch downward along said track from a latch opening to a next lower latch opening.

2. Apparatus as defined in claim 1 wherein said track further has a plurality of apertures defining positions for said slider, said height adjuster further including a detent device which is mounted on said slider separately from said latch, said detent device including a detent member and a spring biasing said detent member into engagement with said track, said detent member being movable into each of said apertures upon movement of said slider to the corresponding one of said positions.

3. Apparatus as defined in claim 1 wherein each of said directing portions of said track has a ramp surface inclined toward the corresponding latch opening in said track, said latch having a ramp-follower portion slidable along said ramp surfaces.

4. Apparatus as defined in claim 3 wherein each of said latch openings in said track has a lower end, each of said directing portions of said track having a lower end spaced upward from the lower end of the corresponding latch opening.

5. Apparatus comprising:

a seat belt height adjuster including a track, a slider movable vertically along said track, and a latch mounted on said slider;

said track having a plurality of latch openings which are spaced apart along said track;

said latch being receivable in each of said latch openings to block movement of said slider downward along said track;

said track further having a plurality of spaced-apart directing portions corresponding to said plurality of latch openings, each of said directing portions of said track being configured to constrain said latch to move into a next lower latch opening upon movement of said latch downward along said track from a latch opening to a next lower latch opening;

said track further having a plurality of apertures defining positions for said slider, said height adjuster further including a detent device which is mounted on said slider separately from said latch, said detent device including a detent member and a spring biasing said detent member into engagement with said track, said detent member being movable into each of said apertures upon movement of said slider to the corresponding one of said positions.

6. Apparatus comprising:

a seat belt height adjuster including a track, a slider movable vertically along said track, and a latch mounted on said slider;

said track having a plurality of latch openings which are spaced apart along said track;

said latch being receivable in each of said latch openings to block movement of said slider downward along said track;

said track further having a plurality of spaced-apart directing portions corresponding to said plurality of latch openings, each of said directing portions of said track being configured to constrain said latch move into a next lower latch opening upon movement of said latch downward along said track from a latch opening to a next lower latch opening;

each of said directing portions of said track having a ramp surface inclined toward the corresponding latch opening in said track, said latch having a ramp-follower portion slidable along said ramp surfaces;

each of said latch openings in said track having a lower end, each of said directing portions of said track having a lower end spaced upward from the lower end of the corresponding latch opening.

7. Apparatus comprising:

a seat belt height adjuster including a track, a slider movable vertically along said track, and a latch mounted on said slider;

said track having a plurality of latch openings which are spaced apart along said track;

said latch being receivable in each of said latch openings to block movement of said slider downward along said track;

said track further having a plurality of spaced-apart directing portions corresponding to said plurality of latch openings, each of said directing portions of said track being configured to constrain said latch to move into a next lower latch opening upon movement of said latch downward along said track from a latch opening to a next lower latch opening;

each of said directing portions of said track having an inclined ramp surface located in the path of movement of said latch downward along said track, said ramp surfaces facing across said track toward said latch openings in said track so as to guide said latch to move toward and into said latch openings upon movement of said latch downward along said ramp surfaces.

8. Apparatus as defined in claim 7 wherein each of said latch openings in said track has a lower end and each of said ramp surfaces has a lower end spaced upward from the lower end of the corresponding latch opening.

9. Apparatus as defined in claim 7 wherein said track is configured to constrain said latch always to move into a next lower latch opening upon said movement of said latch downward along said track from a latch opening to a next lower latch opening.

* * * * *